United States Patent Office 3,202,704
Patented Aug. 24, 1965

3,202,704
PROCESS FOR THE SILVER OXIDE CATALYZED OXIDATION OF UNSATURATED CYCLIC OZONIDES
Robert H. Perry, Jr., Baytown, Tex., assignor, by mesne assignments, to Esso Research and Engineering Company, Elizabeth, N.J., a corporation of Delaware
No Drawing. Filed Feb. 23, 1961, Ser. No. 90,921
16 Claims. (Cl. 260—533)

The present invention relates to the regenerative silver oxide oxidation of hydrocarbons. More particularly, it is directed to the selective oxidation of unsaturated hydrocarbon products of ozonolysis to produce unsaturated acids. Specifically, the invention comprises the selective oxidation of the ozonolysis linkage in an unsaturated ozonolysis product while leaving the unsaturated linkage intact. This is accomplished by using silver oxide in catalytic quantities to promote oxidation of the unsaturated ozonolysis product by contact with molecular oxygen, utilizing a base to maintain the pH of the reaction mixture within critical limits.

The present invention is also directed to new compositions of matter prepared by the process of the present invention: 2-vinyl-1,4-butanedicarboxylic acid ($\beta$-vinyladipic acid) and 4-octene-1,8-dioic acid.

The unsaturated dicarboxylic acids, which are the major product of the present invention, find utility in the art as "building blocks," particularly in the formation of polymers wherein cross linkages are desirable. The unsaturated double bond of these acids allows cross-linking, while in the dicarboxylic alpha-omega formation each end of the molecule is reactive and conducive to polymer formation. It is therefore possible to prepare polyesters through condensation copolymerization of a dicarboxylic acid with a di- or polyfunctional alcohol and subsequently further react the polymer so formed with other suitable monomers to give modified or cross-linked polymers. The presence of the unsaturation affords a site through which copolymerization with styrene or similarly reactive vinyl monomers may occur.

Heretofore the preparation of these useful acids was fraught with many difficulties. Direct oxidation of olefins with oxygen frequently results in the formation of numerous products, many of which may not be desirable. In some cases certain catalysts may be employed to enable attack at the olefinic double bond so that epoxides are produced. It is generally not possible to convert a mono- or poly-olefin to an unsaturated mono- or polycarboxylic acid selectively by simple and straight forward methods. The present process is a novel and highly effective way of preparing unsaturated acids that are normally not readily accessible. The advantages are:

(1) High selectivity of double bond cleavage using ozonolysis of only one double bond of a compound containing multiple olefinic linkages;
(2) High selectivity in the subsequent oxidation step so that high yields of unsaturated acids are produced; and
(3) The process, since a catalyst is used together with a cheap oxidant (oxygen or air), is a practical one and can be conducted inexpensively on a commercial scale.

Many other oxidation processes, for example, involving such reagents as permanganate salts, nitric acid, hydrogen peroxide, etc., either are not selective in cleaving only one double bond in a system of multiple double bonds, or do not cleave a carbon-carbon double bond in a complete fashion sufficient to give high selectivity to carboxylic acid.

The use of the present ozonolysis-oxidation process is effective because ozone may be added to the polyolefin to such an extent that only one double bond is cleaved. This may generally be accomplished by operating at low conversions of olefin. In some cases the rate of attack on the second and subsequent double bonds in the same molecule is diminished following attack on the first, so that selectivity is enhanced. Also, the double bonds may be of unequal reactivity. For example, the preparation of $\beta$-vinyladipic acid in high selectivity is possible by virtue of the fact that the endocyclic double bond is more reactive toward ozone than is the exocyclic double bond.

In my copending application Serial No. 837,783, now U.S. Patent 3,059,028 issued October 16, 1962, it was disclosed that selective oxidation to carboxylic acids of an unsaturated ozonolysis product could be accomplished by the use of a heavy metal oxide, with the heavy metal oxide being reduced to the pure metal. Obviously, by the practice of that process, stoichiometric amounts of the heavy metal oxide were required, and the problem of recovery of the reduced metal was presented.

It has been found by the present process that less than stoichiometric amounts of silver oxide may be used in producing the unsaturated acid by carefully controlling the pH of the solution, and by introducing molecular oxygen in excess into the solution during the oxidation process. This process is not a net consumer of the silver oxide, as was the case in the copending application, but is suited to the recycle of the silver oxide for reuse in a continuous process. Of course, a greater than stoichiometric amount of the catalyst may be used if desired, but preferably a lesser amount is utilized.

A general approach to the production of unsaturated acids has been found to be attractive, which entails the ozonolysis of a polyunsaturated hydrocarbon to produce an intermediate compound which retains an unsaturated linkage while also containing an ozonide, alkoxy hydroperoxide, etc. grouping at the double bond which was attacked during ozonolysis. The difficulty in this approach is that the reactivity toward "normal" oxidants ($H_2O_2$, peracids, etc.) of the ozonide grouping is of the same order as the reactivity at the double bond. As set forth in my aforementioned copending application, the use of a stoichiometric amount of a heavy metal oxide for oxidation of the ozonolysis linkage to the carboxyl final form provides a selectivity of oxidation which retains the unsaturated hydrocarbon linkage. By the practice of the present invention, it has been found that introducing molecular oxygen into the reaction solution while maintaining the pH within a critical range, it is possible to utilize silver oxide in catalytic quantities rather than as a reagent in stoichiometric amounts. Further, by the practice of the present invention, the silver oxide is itself regenerated and at the end of the oxidation reaction is present in its initial quantities in the oxide form rather than being reduced to a nonreactive metal, and is suitable for reuse in a subsequent oxidation reaction.

In the use of the ozonolysis route to production of the dicarboxylic acids, it will be remembered that during ozonolysis the intermediate product formed is dependent upon the character of the solvent to be used. Where a reactive solvent is used during ozonolysis, the resulting product is usually a hydroperoxide or a single derivative of a hydroperoxide and the carbonyl fragment produced, e.g., $$RCH=CHR' + O_3 \xrightarrow{R''OH}$$

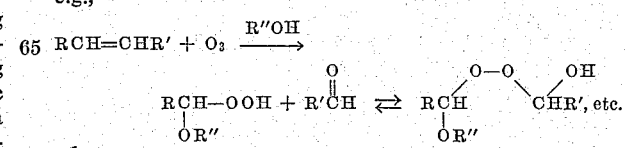

where:
R,R' represents an alkyl or aryl group and
R'' represents an alkyl or acyl group.

The radicals R and R' may suitably be joined together to form a cyclic compound as set forth in Examples I through IV hereinbelow. If a nonreactive solvent has been used during ozonolysis, the characteristic grouping of the intermediate product may be a peroxide or an ozonide group as shown below:

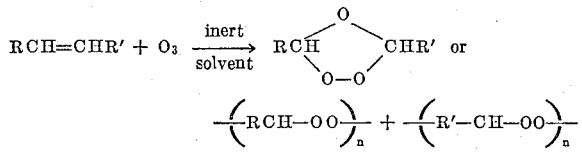

where:

R and R' represent an alkyl or aryl group; or
R and R" may suitably be joined to form a cyclic compound.

Regardless of the nature of the ozonolysis solvent, however, and consequently the kind of peroxidic product afforded, the oxidative decomposition as above discussed must be accomplished within critical limits of pH. That is, the reaction medium must be maintained within the range of about pH 10 to about pH 12. This may suitably be accomplished by control of the addition rate of an alkaline medium such as sodium hydroxide. Below a pH of about 10, the oxidation process rate drops markedly, while above pH 12 the ozonolysis products tend to polymerize extensively with concomitant product loss.

By the practice of the present invention, the selective oxidation of an ozonolysis product is carried out by initiating a reaction between the ozonolysis product and the silver oxide while passing molecular oxygen through the solution in excess, and while maintaining the pH of the solution within the range from about 10 to about 12. The ozonolysis product may be dissolved in a liquid such as water or a low molecular weight alcohol in amounts sufficient to provide a concentration within the range of 5% to about 50% by weight. This liquid solvent may suitably be the solvent in which the ozonolysis was accomplished (i.e., either the reactive or unreactive solvent of the ozonolysis process). The silver oxide employed in the liquid phase during the selective oxidation of the ozonolysis product is catalytic in amount, and may vary between 1% and 20% by weight. The ratio of oxide catalyst to ozonolysis product may vary between 0.1 and 1.0. The oxygen addition rate can be varied broadly within the range of 1 mol of oxygen per mol of ozonolysis product per hour to about 10 mols per mol per hour based on the ozonolysis product in the solution. The pressure may suitably be maintained within the range from about 0 p.s.i. to about 100 p.s.i. A base such as the hydroxide of an alkali metal or alkaline earth metal in an aqueous or alcoholic solution, or in solid form can be used to control the pH—for example, NaOH, or Ca(OH)$_2$. Aqueous alkali such as sodium hydroxide solution may be added dropwise to the suspension to maintain the solution within the narrow pH range above stated. Cooling is applied to maintain the temperature within a general range of 30° C. to 50° C., preferably within the range of 30° C. to 40° C. During the oxidation of these ozonolysis products, it is well to keep in mind the fact that as long as unoxidized peroxides are present in the suspension, the sodium hydroxide concentration must be kept below the upper limit of the range above-stated, to prevent undue polymerization and loss of product. At the end of the dropwise addition of the sodium hydroxide, approximately 30 minutes after the initiation of the reaction, the suspension is chilled, the silver oxide filtered off, and the organic acid liberated from the filtrate by acidification to a pH of 2 to 4 with a dilute mineral acid such as HCl, H$_2$SO$_4$, HNO$_3$, etc., or an organic acid such as formic acid, trifluoroacetic acid, etc.

As exemplary of the present invention, the following examples are shown to illustrate the conversion of C$_8$ to C$_{12}$ monocyclic olefins having from 2 to 3 nonconjugated, unsaturated bonds, at least one of which is in the ring, into the alpha-omega dicarboxylic acid. In particular, there is shown the conversion of cyclododecatriene to 4,8-dodecadien-1,12-dioic acid, the conversion of 4-vinylcyclohexene to β-vinyladipic acid, and the conversion of 1,5-cyclooctadiene to 4-octene-1,8-dioic acid.

*Example I*

One mol, 162 g., of 1,5,9-cyclododecatriene is treated with ozone in a solvent such as methanol until 20% conversion based on one double bond in cyclododecatriene has been reached. The unconverted material is removed by extraction, or preferably by steam distillation; if some decomposition of the peroxidic intermediate to aldehydic products occurs, this is not an undesirable effect. An aqueous methanolic suspension (if methanol is used as the ozonolysis solvent) of the peroxide-aldehyde mixture with 15 grams silver oxide is stirred rapidly at 30° to 50° C. while oxygen is passed through the mixture in excess (0.02 cu. ft./min. for 250 ml. of reactants provides a large excess). Aqueous alkali such as sodium hydroxide solution is added dropwise to the suspension to keep the pH within the range of 10 to 12, and cooling is applied to maintain the temperature range within the above limits, preferably within the range of 30° to 40° C. At the end of the addition of the caustic solution (for example, after a period of 30 minutes) the reaction is stopped, silver oxide is filtered off, and the organic acid is liberated from the filtrate by acidification with hydrochloric acid. The selectivity to 4,8-dodecadien-1,12-dioic acid from one such experiment was approximately 95%. The silver oxide which has been removed is suitable for reuse and may be recycled to the oxidation step of subsequent treats.

*Example II*

One-half mol, 54 g., of 4-vinylcyclohexene which had been prepurified to remove peroxides, was ozonized in solution with 450 ml. of acetone by passing 0.08 cu. ft./min. of gas containing about 3.5 wt. percent ozone through the solution at −78° C. until 260 liters of exit gas were indicated. This was an indication that 0.25 mol of ozone had been absorbed. The solvent was removed under reduced pressure, leaving 54.2 g. of a peroxidic gel. The gel was slurried with 150 ml. of acetone and 100 ml. of methanol, and subsequently added along with 100 ml. of water to a vessel fitted with a stirrer. The mixture was heated to boiling and a large portion, 184 ml., of the acetone and methanol were distilled off. At 70° C. vapor temperature and 78° C. pot temperature, the distillation was stopped and the mixture cooled to 25° C. Silver oxide, 10 g., and 50 ml. of methanol were added to the vessel and a reflux condenser was attached thereto. Oxygen at the rate of .02 cu. ft/min. was passed through the stirred suspension. After 5 minutes, addition of a solution of 20 g. of sodium hydroxide and 50 ml. of water was begun. This addition was accomplished dropwise over a period of 1¼ hrs. while the temperature of the suspension was maintained at 30° C. to 35° C. by means of a cooling bath. The pH was maintained between pH 10 and pH 12. Oxygen was passed through the suspension for a period of 15 min. after the addition of the sodium hydroxide solution was complete, after which the suspension was filtered and the filtrate acidified to a value of pH 2. The volume of solution was reduced to one-half by vacuum distillation and the solution was then extracted with six 100 ml. portions of ether. The organic solutions resulting from the extraction were evaporated under reduced pressure to give 42.2 g. of nonvolatile residues. A small sample of this crude residue was converted, using diazomethane, to methyl esters and the methyl esters separated by partition chromatographic means using an Apiezon "L" substrate on firebrick support. Based on these data, the selectivity of the reaction to β-vinyladipic acid was calculated to be 89.5%. This general procedure was repeated several times with selectivities being 80% to 90% for vinyladipic acid. Cyclohexene-4-carboxylic acid was also produced an quantities ranging from 2% to 5%.

A sample of the crude acidic product which was in the form of a mushy solid was placed on a clay plate and allowed to stand until hardened. The melting point of the product so dried was between 80° C. and 82° C. It was in the form of a yellowish solid which was soluble in water, acetone, ether and chloroform and insoluble in carbon tetrachloride. Decolorization using Nuchar was more effective in aqueous media than in organic media although removal of the last traces of color was difficult. The melting point of the purest product obtained was between 81° C. and 82° C.

Analysis of this solid acid showed that it was 2-vinyl-1,4-butanedicarboxylic acid, or β-vinyladipic acid.

Elemental analysis: Calc'd. for $C_8H_{12}O_4$: C, 55.80; H, 7.03. Found: C, 55.93, 56.05; H, 7.13, 7.26.

Neutral equivalent (N.e.). Calc'd.: 86.1. Found: 87.0.

Qualitative tests showed the presence of olefinic unsaturation. The compound reacted instantaneously with potassium permanganate precipitating manganese dioxide, and its decolorized bromine in an aqueous system.

Both the acid and the corresponding dimethyl ester (prepared by reaction with diazomethane) possessed infrared absorption bands at 10.0 and 10.8μ (vinyl group), 6.1μ (olefinic band), 5.8μ (carbonyl) in addition to other absorption bands expected of these compounds. The NMR spectra were in complete accord with the structures: β-vinyladipic acid and corresponding ester. The ester elemental analysis was as follows:

Calc'd. for $C_{10}H_{16}O_4$: C, 59.98; H, 8.05. Found: C, 60.70; H, 8.25.

Finally, β-vinyladipic acid was converted using ozonolysis in methanol followed by oxidation with hydrogen peroxide in formic acid to give as the only non-volatile product, 1,2,4-butanetricarboxylic acid; M.P. 123–124° C. Mixture M.P. with an authentic sample was not depressed.

The structural formula of the product is:

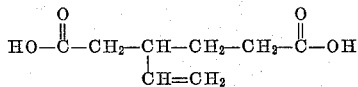

β-Vinyladipic acid may be used as a chemical intermediate for the preparation of other polyfunctional compounds via reaction of the vinyl group. For example, compounds useful as plasticizers may be obtained by esterifying the carboxyl groups with many kinds of aliphatic or alicyclic alcohols followed by epoxidation of the vinyl group to give epoxy esters. These compounds are well known as very good epoxy and vinyl plasticizers.

The acid can be used as a comonomer with an olefin, for example, to function as a modifier in a polyolefin such as polystyrene, butyl rubber, polyisobutylene, polybutadiene, GRS, etc., and the presence of carboxyl groups provides reactive centers for better adhesion to rubber and other materials, or for use with adhesive-forming materials such as polyisocyanates, polyurethanes, etc. Also, a kind of graft or block polymer may be produced. For example, an olefin such as styrene is copolymerized with vinyladipic acid and is cross-linked through the carboxyl groups by reaction with glycols, etc.

*Example III*

1,5-cyclooctadiene (108 g., 1.0 mol) was dissolved in 300 ml. of methanol and 150 ml. of dichloromethane and treated with ozone (ca. 3.5 wt. percent in oxygen) at 1.2 liters/minute until 0.2 mol of ozone had been absorbed. The solvent was removed under reduced pressure to a mixture consisting of peroxidic intermediate and recovered cyclooctadine. Petroleum ether (50 ml.) was added to the residual oil, and the cyclooctadiene washed away from the separate, peroxidic phase by decantation. The process was repeated twice. The peroxide was dissolved in 150 ml. of methanol and washed into the oxidation flask to which was attached a high speed stirrer. One hundred ml. water were added, and the solution was heated to 80° to 90° C. (the methanol distilled off) to provide partial decomposition of the peroxide. The mixture was cooled to 25° C., 10 g. of silver oxide were added and the mixture stirred for 15 minutes at room temperature. Oxygen flow through a fritted bubble tube was begun at 0.6 l./min., and a solution of 20 g. of sodium hydroxide in 50 ml. of water was added over a period of one hour while maintaining the reaction solution at pH 10 to pH 12, with external cooling provided to maintain the temperature in the range of 30° to 35° C. The slurry was filtered, the filtrate acidified to pH 2 and extracted with 3–100 ml. portions of ether. The ether was evaporated leaving 36.4 g. of an oily, semicrystalline mass. The product was treated with hot tetrachloride and cooled to remove in three successive crystallizations all of the crystallizable product. The tan crystals were dissolved in acetone and decolorized with charcoal giving colorless crystals, M.P. 102° to 105° C.; the total yield of purified product was approximately 75%.

The product exhibited olefinic unsaturation in qualitative tests and in the IR and NMR spectra. These data and the fact that the relative numbers of hydrogens in the NMR spectrum were in firm agreement with these calculated for 4-octene-1,8-dioic acid are evidence for this structure of the product. Further proof was obtained by treatment of an analytical sample of this acid with ozone, in which case exactly one mol was absorbed, followed by oxidative decomposition with hydrogen peroxide in formic acid to give highly pure (M.P. 188° to 190° C.) succinic acid in quantitative yield.

The method of the present invention has general application as illustrated by the examples given, and may be used in the selective oxidation of cyclic and aliphatic unsaturated ozonolysis products. The scope of the present invention should not be limited by the examples above given, but only by the appended claims.

I claim:

1. A composition of matter, 2-vinyl-1,4-butanedicarboxylic acid.

2. A method of producing an olefinically unsaturated α,ω-dicarboxylic acid from a $C_8$ to $C_{12}$ monocyclic olefin having from to 2 to 3 non-conjugated olefinic bonds, at least one of which is in the ring, which comprises ozonizing said olefin in an ozonolysis solvent at a temperature of —78° C. to +30° C. until from 0.2 to 0.5 mol of ozone per mol of olefin has been reacted, whereby an olefinic ozonolysis product is obtained, contacting said olefinic ozonolysis product in an ozonolysis solvent and in the liquid phase at a temperature of 30° C. to 50° C.

while adding a base chosen from the group consisting of alkali metal hydroxides and alkaline earth metal hydroxides to maintain the pH within the range of pH 10 to pH 12, with a molecular oxygen containing gaseous stream and a catalytically effective amount of silver oxide, to obtain a double salt of the α,ω-dicarboxylic acid, and acidifying said double salt to obtain the olefinically unsaturated α,ω-dicarboxylic acid product.

3. A method in accordance with claim 2 wherein the pH is maintained within the recited range by the addition of sodium hydroxide.

4. A method in accordance with claim 2 wherein the solvent is methanol and the base is sodium hydroxide.

5. A method in accordance with claim 2 wherein the monocyclic olefin is 4-vinylcyclohexene.

6. A method in accordance with claim 2 wherein the monocyclic olefin is 1,5-cyclooctadiene.

7. A method in accordance with claim 2 wherein the monocyclic olefin is 1,5,9-cyclododecatriene.

8. A method which comprises ozonizing 4-vinylcyclohexene in an ozonolysis solvent at a temperature of −78° C. to +30° C. until about 0.5 mol of ozone per mol of 4-vinylcyclohexene has been reacted, whereby a vinyl-substituted ozonolysis product is obtained,
contacting said ozonolysis product in an ozonolysis solvent and in the liquid phase at a temperature of 30° C. to 50° C.
with a molecular oxygen-containing gaseous stream and a catalytically effective amount of silver oxide,
while adding a base chosen from the group consisting of alkali earth metal hydroxides and alkaline earth metal hydroxides to maintain the pH within the range of pH 10 to pH 12,
to obtain a double salt of 2-vinyl-1,4-butane-dicarboxylic acid and said base,
and acidifying the double salt to obtain 2-vinyl-1,4-butanedicarboxylic acid.

9. A method in accordance with claim 8 wherein the monoozonolysis is accomplished in an acetone solvent.

10. A method in accordance with claim 8 wherein the ozonolysis solvent is acetone in the ozonolysis step, the ozonolysis solvent is a water-methanol-acetone admixture in the oxidation step, acidification is accomplished by the addition of a dilute mineral acid to change the pH to a value within the range of pH 2 to pH 4, and further comprising the step of recovering said 2-vinyl-1,4-butanedicarboxylic acid.

11. A method of producing 4-octene-1,8-dioic acid which comprises
ozonizing 1,5-cyclooctadiene in an ozonolysis solvent at a temperature of −78° C. to +30° C. until about 0.2 mol of ozone per mol of 1,5-cyclooctadiene has been reacted to produce an olefinic ozonolysis product,
forming an aqueous solution of said ozonolysis product,
contacting said ozonolysis product with a catalytically effective amount of silver oxide and a molecular oxygen-containing gaseous stream while adding a base chosen from the group consisting of alkali metal hydroxides and alkaline earth metal hydroxides to maintain the pH within the range of pH 10 to pH 12,
at a temperature within the range of 30° C. to 50° C., and acidifying the oxidation product to obtain 4-octene-1,8-dioic acid.

12. A method in accordance with claim 11 wherein the base is added until from about 2.0 to about 2.5 mols of base per mol of 1,5-cyclooctadiene have been added.

13. A method in accordance with claim 11 wherein the temperature during oxidation is maintained within the range of 30° C. to 35° C.

14. A method of preparing 4,8-dodecadiene-1,12-dioic acid which comprises
ozonizing 1,5,9-cyclododecatriene to about 20% conversion based on one double bond, said ozonizing step being accomplished in an ozonolysis solvent at a temperature within the range of −78° C. to +30° C.,
whereby an olefinic ozonolysis product is obtained,
contacting said ozonolysis product with a catalytic amount of silver oxide and a molecular oxygen-containing gaseous stream while adding a base chosen from the group consisting of alkali metal hydroxides and alkaline earth metal hydroxides to maintain the pH within the range of pH 10 to pH 12,
at a temperature with the range of 30° C. to 50° C., and acidifying the oxidation product to obtain 4,8-dodecadiene-1,12-dioic acid.

15. A method in accordance with claim 14 wherein the temperature is within the range of 30° C. to 40° C.

16. A method in accordance with claim 14 wherein the base is sodium hydroxide, and the acidification is accomplished by the addition of hydrochloric acid.

References Cited by the Examiner

UNITED STATES PATENTS

| | | | |
|---|---|---|---|
| 2,819,279 | 1/58 | Brown et al. | 260—604 |
| 2,848,490 | 8/58 | Niebling et al. | 260—537 |
| 2,887,496 | 5/59 | Montagna et al. | 260—515 |
| 2,930,801 | 3/60 | Montagna et al. | 260—530 |
| 3,059,028 | 10/62 | Perry | 260—533 |

FOREIGN PATENTS 740,005   11/55   Great Britain.

OTHER REFERENCES

Bailey: "Chem. Reviews," vol. 58, No. V (1958), pp. 925–1010.

Gouin: Compt. rend., vol 238, pages 1235–7 (1954).

Lukes: Chemical Abstracts, vol. 53, page 3055C (1959).

LORRAINE A. WEINBERGER, *Primary Examiner.*

CHARLES B. PARKER, LEON ZITVER, *Examiners.*